United States Patent
Leite et al.

(10) Patent No.: US 12,063,890 B2
(45) Date of Patent: Aug. 20, 2024

(54) ELECTRONIC SOIL COPING SYSTEM APPLIED TO A GRAIN HARVESTING PLATFORM

(71) Applicant: Indústrias Reunidas Colombo Ltda., Pindorama (BR)

(72) Inventors: Oswaldo Argeu Leite, Catanduva (BR); Vagner Nunes Da Silva, Matão (BR)

(73) Assignee: INDÚSTRIAS REUNIDAS COLOMBO LTDA., Pindorama—SP (BR)

( * ) Notice: Subject to any disclaimer, the term of this patent is extended or adjusted under 35 U.S.C. 154(b) by 909 days.

(21) Appl. No.: 17/111,823

(22) Filed: Dec. 4, 2020

(65) Prior Publication Data
US 2021/0169006 A1     Jun. 10, 2021

(30) Foreign Application Priority Data
Dec. 4, 2019    (BR) .................... 102019025605-2

(51) Int. Cl.
| | |
|---|---|
| *A01D 51/00* | (2006.01) |
| *A01D 29/00* | (2006.01) |
| *A01D 45/00* | (2018.01) |
| *A01D 45/22* | (2006.01) |

(52) U.S. Cl.
CPC ......... *A01D 51/002* (2013.01); *A01D 51/007* (2013.01); *A01D 29/00* (2013.01); *A01D 45/00* (2013.01); *A01D 45/22* (2013.01)

(58) Field of Classification Search
None
See application file for complete search history.

(56) References Cited

U.S. PATENT DOCUMENTS

| | | |
|---|---|---|
| 5,205,114 A | 4/1993 | Hobbs |
| 9,775,294 B2 | 10/2017 | Bertino |
| 9,788,488 B2 | 10/2017 | Bertino |
| 10,849,272 B2 | 12/2020 | Bertino et al. |

FOREIGN PATENT DOCUMENTS

| | | | | |
|---|---|---|---|---|
| DE | 102005035634 A1 | * | 2/2007 | ............. A01D 34/82 |
| DE | 102005035636 A | * | 2/2007 | ............. A01D 34/86 |
| EP | 1520465 A1 | * | 4/2005 | ............... A01D 5/28 |

* cited by examiner

*Primary Examiner* — Wayne A Langel
(74) *Attorney, Agent, or Firm* — B. Aaron Schulman, Esq.; Stites & Harbison, PLLC

(57) ABSTRACT

Electronic soil coping system applied to a grain harvesting platform, able to adjust working height parameters during the collection process, adapting itself to soil irregularities and to those generated by uprooting, increasing the efficiency and reducing loss, enabling to combine belt collection at any time, individually, in pairs, or all of them jointly, generating different physical states, which will vary according to the number of belts of the device, also allowing the platform to perform tailpieces at street ends, not collecting undesired materials, and also allowing to increase the width of collection belts.

2 Claims, 1 Drawing Sheet

ELECTRONIC SOIL COPING SYSTEM APPLIED TO A GRAIN HARVESTING PLATFORM

FIELD OF THE INVENTION

An electronic soil copying system, as applied to a platform intended for collecting agricultural products, with the joint application to a self-propelled agricultural vehicle, more precisely for harvesting grains such as peanuts, beans or any other product which may be spread on plots and may be collected from the soil.

BACKGROUND OF THE INVENTION

The current state of the art already knows the self-propelled device as disclosed by the patent document U.S. Pat. No. 9,775,294, disclosing a harvesting platform with a mechanical system by means of bearings adaptable to the soil level, independently adjusted for each plot to be collected.

The state of the art already knows a peanut harvester combined to a header for lifting peanut laden vines from the ground, disclosed by the patent document U.S. Pat. No. 5,205,114, incorporating an auger for distributing the peanut laden vines; a series of cylinders for threshing the peanut laden vines and a series of separator cylinders to remove the peanuts from the laden vines, including fingers to propel the vines and rotate at a variable flailing speed; said fingers including tips which vary in angle with respect to the path defined by the fingers, while said separator cylinders rotate.

The state of the art also knows a collecting conveyor with slots, shafts and a chain impelled by a gear, disclosed by the patent document U.S. Pat. No. 9,788,488, collecting the material laid on the plot and transporting it to inside the harvesting device.

All state-of-the-art documents as mentioned have the main inconvenience that the collecting height references by bearings cannot be readjusted during the harvest, which is a desired condition, due to pre-existing irregularities on the soil and those as created during uprooting.

All the state-of-the-art documents as mentioned also present the inconvenience that the mechanical soil copying system has considerable weight, causing soil compaction.

Another inconvenience caused by the current skills is related to the difficulties to prepare tailpieces at the end of streets, and undesired materials next to the mass located on the soil may be collected.

Therefore, it is desirable to propose a device which is able to overcome the inconveniences in the state of the art.

BRIEF DESCRIPTION OF THE INVENTION

The present invention seeks to provide an electronic soil copying system applied to the grain harvesting platform, improving the research performance, reducing losses and improving the processing quality of the harvested material.

The present invention also seeks to provide an electronic soil copying system as applied to the grain harvesting platform, acting independently for each plot, able to follow a soil profile, with excellent response time for actuation.

The electronic soil copying system as presented herein is also able to adjust height working parameters during the collecting process, adapting itself to soil irregularities and to those irregularities caused by uprooting, increasing efficiency and reducing loss.

The electronic soil copying system as presented herein may combine collecting of at least one belt, at any time of collection, individually, in pairs, or all of them jointly.

The electronic soil copying system as presented herein will allow the grain collection platform to perform tailpieces at row ends, not collecting undesired materials.

The electronic soil copying system as presented herein also allows to increase the width of collecting belts for grain harvesting.

DETAILED DESCRIPTION OF THE INVENTION

The electronic soil copying system of the claimed invention will be preferably, but not solely, applied to the grain collection platform as disclosed by the application U.S. Ser. No. 16/149,984, dated Oct. 2, 2018, which is incorporated herein by reference.

Figure 1:
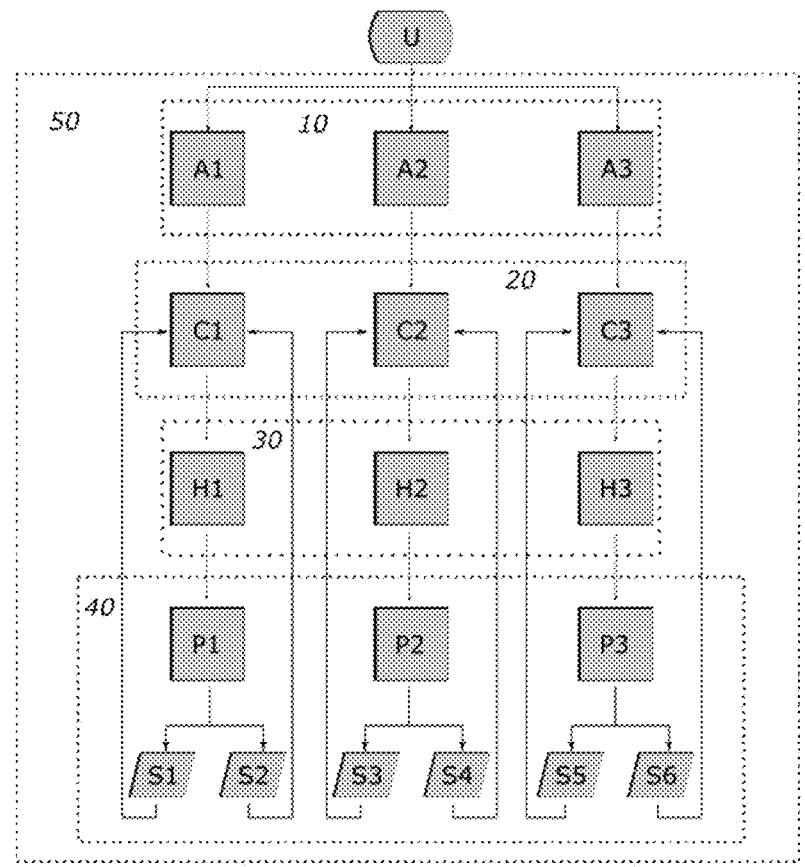
FIG. 1 shows a block diagram for belt collecting height control.

As shown in FIG. 1, the electronic soil copying system is activated by the user (U), by inputting into the monitor (10) the values established for the collecting heights of the left belt (A1), the middle belt (A2) and the right belt (A3), said values being fed into the electronic module (20), holding control logics (C1) for the collecting heights of the left belt, control logics (C2) for the collecting heights of the middle belt and control logics (C3) for the collecting heights of the right belt. During the operation, hydraulic electrovalve (H1) for the left belt, hydraulic electrovalve (H2) for the middle belt and hydraulic electrovalve (H3) for the right belt, on the electri-hydraulic module (30) activate the trigger (P1) for the left belt, the trigger (P2) for the middle belt and the trigger (P3) for the right belt, on the actuator module (40), based on the real time measurement of the collecting heights of the belts, obtained by the sensors (S1 and S2) for the left belt, sensors (S3 and S4) for the middle belt and sensors (S5 and S6) for the right belt, on said actuator module (40), leveling the real collecting heights of the belts with the collecting heights of the belts configured by the user. For that purpose, the collecting height sensors (S1 and S2), for the left belt, the collecting height sensors (S3 and S4) for the middle belt and the collecting height sensors (S5 and S6) for the right belt of the actuator module (40) constantly communicate to the collecting height control logics (C1), (C2) and (C3) for the left, middle and right belts of the electronic module (20).

Figure 2:
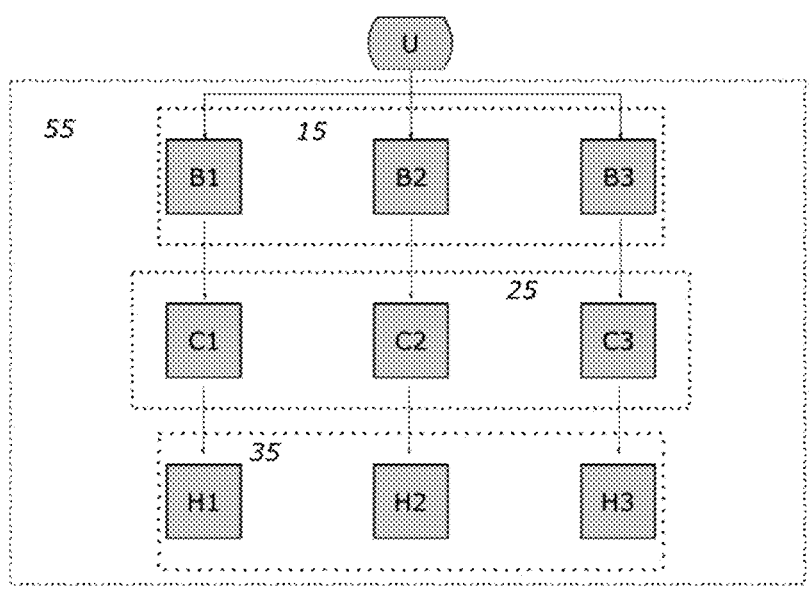
FIG. 2 shows a block diagram for collecting belt blocking selection.

As shown in FIG. 2, including the use of three belts, the electronic soil copying system as presented enables the user (U) to block one or more belts, individually, in pairs or jointly, by indicating on the monitor (15) which belt(s) will be blocked (B1), (B2) and (B3), which may be, in a first state, the left belt (A1); in a second state, the left (A1) and middle (A2) belts; in a third state, the left (A1) and right (A3) belts; in a fourth state, the middle belt (A2); in a fifth state, the middle (A2) and right (A3) belts; in a sixth state, the right (A3) belt or, in a seventh state, the left (A1), middle (A2) and right (A3) belts, being said indication(s) fed into the electronic module (25), which actuates the control logics (C1), (C2) and (C3) to block the left, middle and right belts respectively; the electro-hydraulic module (35) blocking the actuation of the hydraulic electrovalves (H1) and/or (H2) and/or right (H3) for the left and/or middle and/or right belts of The number of states will vary according to the number of belts included in the device.

The invention claimed is:

1. An electronic soil copying system applied to a grain collection platform, comprising:
   (a) a left belt, a central belt and a right belt;
   (b) a first monitor receives predetermined values for the collection heights of the left belt, the central belt and the right belt;
   (c) a first electronic module receives predetermined values for the collection heights of the left belt, the central belt and the right belt;
   (d) a first electro-hydraulic module, measures, in real time, the collection heights of the left belt, the central belt and the right belt, through a first hydraulic solenoid valve on the left belt, a second hydraulic solenoid valve on the central belt and a third hydraulic solenoid valve on the right belt, and feeds the first electronic module, with the real time collection heights of the left belt, the central belt and the right belt; and
   (e) an actuator module corrects a level of the left belt, the central belt and the right belt collection heights, to the predetermined values for the retraction heights of the left belt, central belt and right belt, during operation; through a first and second sensors on the left belt, a third and a fourth sensors on the central belt, and a fifth and sixth sensors on the right belt.

2. The electronic soil copying system applied to a grain collection platform of claim 1, further comprising:
   (f) a second monitor receiving predetermined values for the collection heights of the left belt, the central belt and the right belt;
   (g) a second electronic module receiving data from the second monitor of the belt or belts to be blocked, and
   (h) a second electro-hydraulic module, blocking the drive of the left belt, the central belt and the right; individually, in pairs or simultaneously; through a first hydraulic solenoid valve on the left belt, a second hydraulic solenoid valve on the central belt and a third hydraulic solenoid valve on the right belt.

* * * * *